United States Patent [19]

Denzau et al.

[11] Patent Number: 4,760,340

[45] Date of Patent: Jul. 26, 1988

[54] MEASURING AND EVALUATING SURFACE POTENTIALS FOR DETERMINING THE BOUNDARIES OF UNDERGROUND RESERVOIRS

[75] Inventors: Helmut Denzau; Joachim Hollinderbäumer, both of Essen, Fed. Rep. of Germany

[73] Assignee: Pipeline Engineering Gesellschaft fur Planung, Bau- und Betriebsuberwachung von Fernleitungen mbH, Essen, Fed. Rep. of Germany

[21] Appl. No.: 896,445

[22] Filed: Aug. 13, 1986

[30] Foreign Application Priority Data

Aug. 16, 1985 [DE] Fed. Rep. of Germany ....... 3529466

[51] Int. Cl.$^4$ ............................................. G01V 3/38
[52] U.S. Cl. ...................................... 324/348; 324/323
[58] Field of Search ................... 324/323, 348-350, 324/354, 357, 363; 166/252; 73/155; 364/422

[56] References Cited

U.S. PATENT DOCUMENTS 2,368,218  1/1945  Hayes .................................... 324/348
3,496,768  2/1970  Boucher ................................ 324/348
4,449,099  5/1984  Hoehn ................................... 324/350

FOREIGN PATENT DOCUMENTS 924110  7/1947  France .
1448887  7/1966  France .

OTHER PUBLICATIONS

Buchheim et al., Textbook of General Physics Part II, 1958, pp. 10-15.
Chemical & Engineering News, "Electrochemical Readings Detect Oil", vol. 49, No. 21, May 24, 1971, pp. 32-33.

Primary Examiner—Reinhard J. Eisenzopf
Assistant Examiner—Walter E. Snow
Attorney, Agent, or Firm—Spensley Horn Jubas & Lubitz

[57] ABSTRACT

At least one string of several spaced measuring probes for the measurement of surface potentials is laid on the surface of the earth in such a manner that several probes are located outside and several probes are located inside the area of the surface over a reservoir. The potentials measured by all probes are polled in a sequence of periodic cycles. The signals from each probe are, during each cycle, filtered to separate higher-frequency changes in the signals from substantially lower-frequency changes in the signals. For the higher-frequency changes in the signals from each probe, an average and/or a sum are determined as a measure of the higher-frequency amplitudes for each probe. The higher-frequency amplitudes for the probes of a string of measuring probes are compared and the location at which the higher-frequency amplitudes for two adjacent probes change abruptly is taken to be the hydrocarbon/water interface in the underground reservoir.

15 Claims, 5 Drawing Sheets

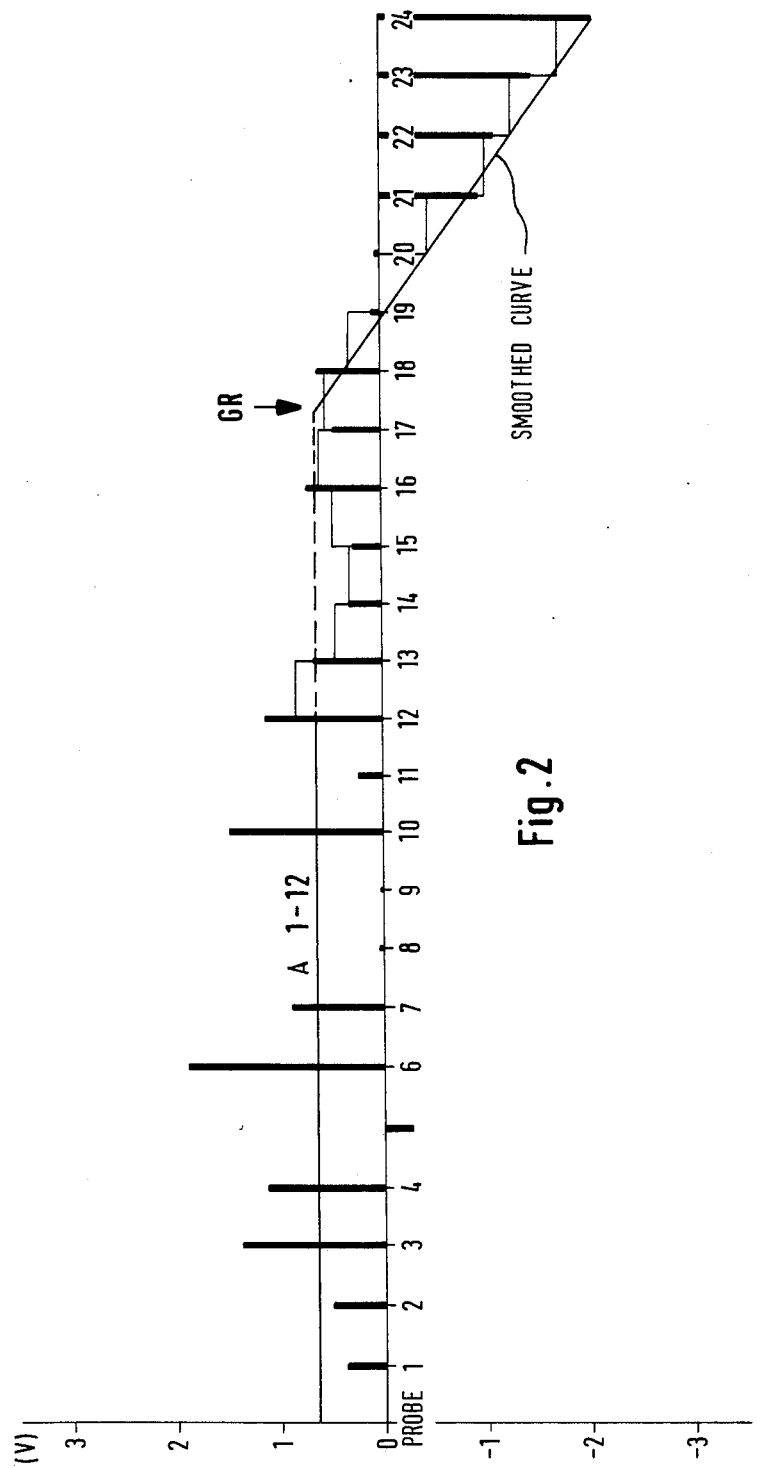

MEASURING AND EVALUATING SURFACE POTENTIALS FOR DETERMINING THE BOUNDARIES OF UNDERGROUND RESERVOIRS

BACKGROUND OF THE INVENTION

1. Field of the Invention

The present invention relates to the determination of the boundaries of underground reservoirs and more particularly to a method of determining the locations of the gas/water interfaces in an underground gas reservoir by measuring surface potentials by means of a system of measuring probes.

2. Prior Art

Well logging and seismic surveys have hitherto been the only two methods of measuring the expansion of gas in an underground aquifer storage reservoir, the latter method being the only conventional above-ground method. In such seismic surveys, the presence of gas is identified by changes in the reflection configurations and the reflection amplitudes of seismic waves. For the application of said seismic technique, it is necessary to make a reference survey prior to the presence of gas in such a reservoir. Through the use of an appropriate grid, gas expansion in the storage horizon for example during the development of an underground storage reservoir may be monitored from time to time. Such seismic surveys and the interpretation of the data of such surveys are complicated and costly. Conventional seismic surveying techniques provide, for each profile, information on the depth, the thickness and the gas saturation of the aquifer storage horizon, thereby allowing the localization of the gas edge. The accuracy of such surveys depends on the quality of the reflection of the seismic waves which is substantially determined by the material of the overburden.

THE INVENTION

It is the object of the present invention to provide for a method necessitating less complex and less costly instrumentation, measurement and interpretation techniques than seismic surveying to determine the presence of gas or other hydrocarbons in and the boundaries of underground reservoirs directly on the surface of the earth.

The present invention provides for such a method by exploiting a multiplicity of potentials (usually referred to as "natural potentials" or "ground potentials" in literature, but referred to simply as "potentials" or "surface potentials" herein in order not to create any confusion by the use of the word "natural" in a context wherein gas or other hydrocarbons may be injected artificially into such a reservoir, thereby changing the natural ground potential as shown hereinbelow) measured by a plurality of measuring probes laid on the surface and forming a string or a grid of probes. The present invention assumes the presence of underground electric conductors. Saline-water-containing underground reservoir sands form such electrical conductors. As, in the case of an aquifer storage reservoir, such conductive saline water is displaced by non-conductive gas, the assumption is made that the surface potentials measured in the case of the presence of below-ground saline water and in the case of the presence of below-ground gas are different. Such surface potentials are also influenced by variations in the magneto-telluric field and in temperature over time as well as by any major ground conductivity differentials at the points where surface potentials are measured, but it is known that the rate of change of said magneto-telluric field and said temperature are relatively slow. Moreover, if and when the method provided for by the present invention is applied, effects of the presence of pipelines and buildings and of operations by man as well as other similar effects should be considered.

The physical correlation between the presence of gas in such an underground reservoir and the potential measured is characterized by the displacement of an electrolyte (saline water) by a nonelectrolytic material (gas), thereby reducing the surface potential measured as a result of all influences and effects described hereinabove over any part of said reservoir in which said displacement has occurred.

According to the present invention, at least one string of measuring probes suitable for the measurement of surface potentials and linearly spaced relative to each other is arranged on the surface of the earth such that some probes are located outside and some other probes are located inside the area of the surface over the reservoir, the approximate boundaries of said reservoir usually being known from other surveys or otherwise. According to one aspect of the present invention, potentials are measured by all such probes and polled in a sequence of polling cycles, said probes being grouped into probes located positively over said reservoir, probes positively not located over said reservoir and probes located in an intermediate area by using low and high values of potentials so polled as grouping criteria. An average value of potential is thereafter computed from the potentials measured by every probe positively located outside said area of the surface over said reservoir, a step function is determined from the average value of potential for every probe located inside said area of the surface over said reservoir as a function of distances between said probes and a function smoothing said step function with a slope corresponding to the slope of said step function, said smoothing function being preferably linear, is formed. The point at which the curve of the average potentials measured by the probes positively located outside said area of the surface over said reservoir prolonged in the direction of said reservoir and the curve representing said smoothed step function intersect is taken to be the hydrocarbon/water interface in said underground reservoir.

The solution according to one aspect of the present invention divulged in the preceding paragraph makes the approximate assumption that the thickness of the gas layer in said reservoir decreases as a linear function of the distance from the boundary of said underground reservoir, the correlation between the increase in the potential measured and the decrease in said thickness therefore also being linear under said approximating conditions. If all influences on the potentials so measured, such as variations in the natural potential due to changes in the magneto-telluric field or in temperature, are eliminated, the assumption may be made that the average potentials for all probes located outside the area of the surface over said reservoir will be equal. In order to eliminate such influences varying as a function of time such as electric field effects in the earth and temperature effects, all probes of any such string of measuring probes must be polled practically simultaneously and in any case at a very rapid rate such as five probes per second. To improve the signal-to-noise ratio of data transmission during such polling cycles, the potentials so polled may be stacked for a preselectable number of polls. The potentials so stacked may be transferred to the magnetic data medium of a microcomputer for digital storage.

If the location of the hydrocarbon/water interface in an underground reservoir is determined as described hereinbefore, the probes of any such string of probes are preferably substantially equidistantly spaced and the curve representing the smoothed function is preferably a straight line passing through substantially corresponding geometric points of the curve representing said step function in a coordinate system, the average potential computed for each of all probes being plotted as a function of distance in said string of measuring probes. This aspect of the present invention allows a simple graphic exploitation of the potentials so measured, the point at which the straight average potential line and the straight line representing said smoothed function intersect representing a point of the gas/water interface in said reservoir.

According to another aspect of the present invention the gas/water interface of an underground reservoir may be determined more accurately by potential measurement using a string or a system of measuring probes by an improved method wherein the potentials measured by all probes are polled in a sequence of cycles. The periodic potential signals so polled for each such probe for a sequence of cycles are filtered by a band-pass filter separating higher-frequency variations in said signals (differences in amplitudes) from substantially lower-frequency variations in said signals. For said higher-frequency variations for each such probe, the average value of all such signals and/or the sum of all such signals are/is determined as a measure of the higher-frequency amplitude for each such probe, the higher-frequency amplitudes of all probes of one string of measuring probes being thereupon compared and the location at which the higher-frequency amplitudes of adjacent probes change abruptly being taken to be the location of the hydrocarbon/water interface in said underground reservoir.

The above-described improvement of the method divulged herein exploits the knowledge developed by comprehensive investigations that the electric field in the area of the surface over a gas reservoir and thence the potentials measured by each measuring probe located therein during a sequence of successive periodic cycles change more strongly as gas is located below said probes than the potentials measured by probes situated outside said area.

For a clear distinction between environmental effects changing over time, such as variations in the magnetotelluric field or in temperature, and the potential amplitudes exploited by the method provided for by the present invention for determining the locations of gas/water contracts, the frequency at which each string of such measuring probes is polled is substantially higher than the frequency at which said environmental effects change.

Measuring potentials by a string of measuring probes spaced relative to each other provided by the present invention may also be used to determine the increase in the thickness of a gas layer in an underground reservoir during the development of an underground gas storage reservoir. If said method is so applied, a reference survey is made prior to the introduction of gas or other hydrocarbons into said underground reservoir and the decreases in surface potentials or changes in higher-frequency amplitudes thereafter measured by the probes in the string of probes hereinabove described during surveys made after said reference survey represent a measure of the increase in the thickness of said gas layer provided that said probes are calibrated adequately.

BRIEF DESCRIPTION OF THE DRAWINGS

The present invention will now be described, by way of example, with reference to the accompanying drawings in which:

FIG. 2 is a graph of the average values of potential determined for the probes of said string I plotted as a function of distance to illustrate the method used in accordance with one aspect of the present invention for determining the gas boundary in said underground reservoir from the average values of potential measured by said probes;

DETAILED DESCRIPTION OF THE INVENTION

A method of determining the surface layout of the boundaries of underground reservoirs and more particularly gas or oil reservoirs is described. In said method several strings of measuring probes, each such string consisting of a plurality of linearly spaced probes, are installed on the surface to measure surface potentials along said strings. In the following description numerous specific details such as specific frequencies, wave lengths, probe distances and filter band widths are set forth to provide a more thorough understanding of the present invention.

It will be obvious, however, to one skilled in the art that the present invention may be practiced without these specific details. In other instances well-known processes and conventional techniques and arrangements such as the specific design of the probes used for the application of the present invention, circuits used to poll said probes and computers employed have not been described in detail unless vital for understanding the present invention in order not to unnecessarily obscure the present invention.

Figure 1:
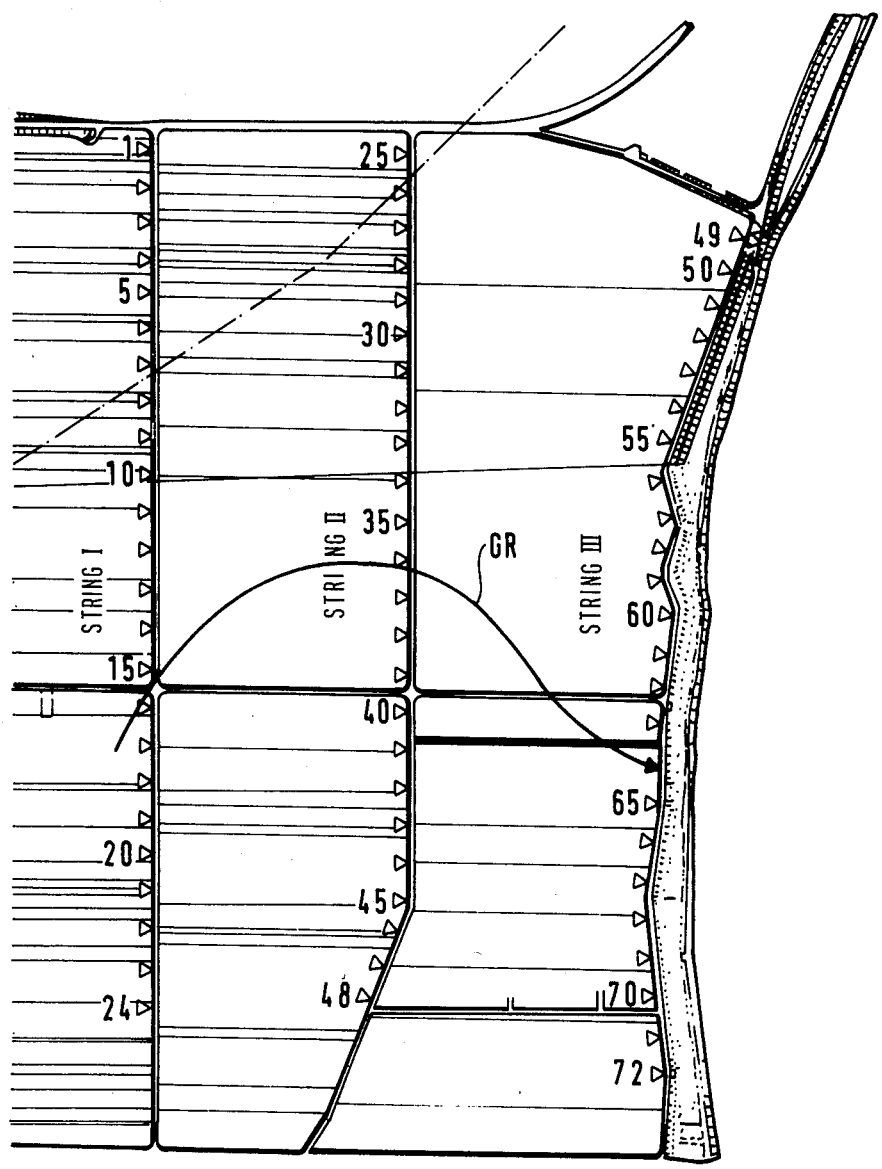
FIG. 1 is a layout of measuring probes used according to the present invention for the determination of the gas boundary in an underground reservoir, said probes being arranged in strings I, II, and III.

Referring first to FIG. 1, the layout shows an arrangement of probes for the measurement of surface potentials used to determine experimentally the location of the gas/water interface in an underground aquifer storage reservoir by the application of the present invention. In said application, three strings of measuring probes I, II, and III consisting of 24 probes spaced at a distance of approx. 50 m each were laid with a distance of approx. 350 m between each two of said three strings. Each such probe is represented by a triangle in FIG. 1. In the application of the present invention herein described, all probes of all three strings located in the area shown by the bottom part of FIG. 1 were positively located in the area of the surface situated over the gas-carrying part of the structure surveyed while all probes of all three strings in the area shown by the top part of FIG. 1 were positively located in the area of the surface situated over the water-carrying part of the aquifer structure, a reference probe having been installed over the water-carrying part of the aquifer structure.

The apparatus used to make the measurement described by way of an example comprises measuring probes, strings of cables interconnecting said probes, a digital data logger to log the potentials measured by said probes, a device to compute average potentials and a microcomputer used to control said measurements and to store the potentials measured. The graphs described by way of example hereinbelow and showing potentials as a function of surface distance have been plotted by a plotter controlled by said microcomputer.

To investigate the influence of near-surface ground material on the potentials so measured, ground samples were taken from a depth of 15 cm (probe depth) at points located some 20 cm away from each of the 72 probes used. The ph value and the conductivity of each such probe were measured several times. To account for external influences on the potentials so measured, temperature and barometric pressure were measured and data on changes in the magneto-telluric field (field direction, vertical intensity and horizontal intensity) were obtained.

The surface potentials measured by all probes of said three strings of probes I, II, and III were recorded at intervals of 20 minutes over a time period of 67 hours. The potentials measured by all probes of one such string of probes were in each cycle polled rapidly at a rate of some five potentials per second, all two hundred potentials measured by each probe being logged over the entire duration of the campaign, thereby obtaining logs over said time period of the type shown by FIGS. 3A and 3B for two probes at opposite ends of one such string of probes.

Figure 3A:
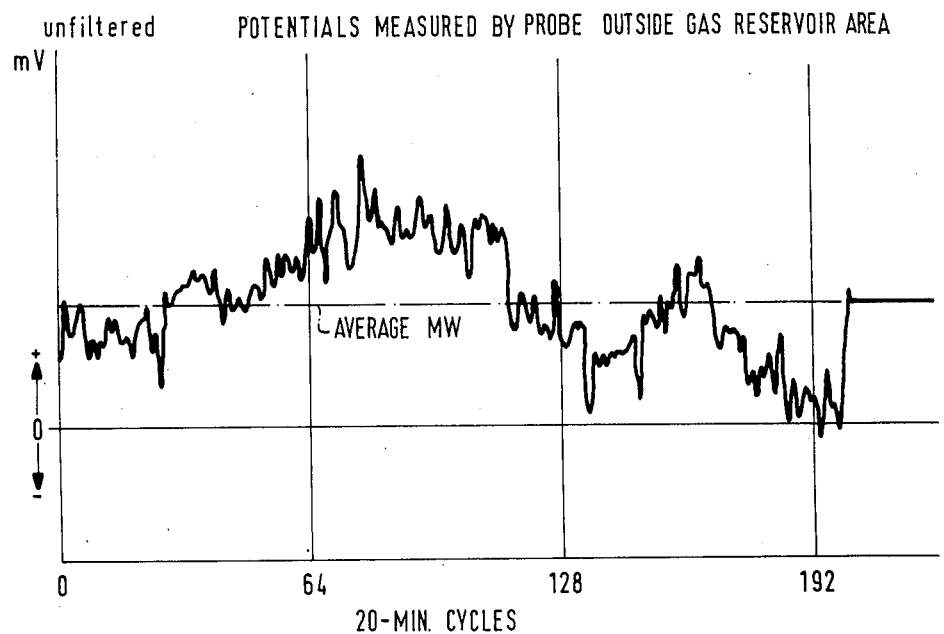
FIG. 3A shows the potentials measured by one probe located outside the area of the surface over said reservoir during the entire time period of said measurements as polled at intervals of 20 minutes.
Figure 3B:
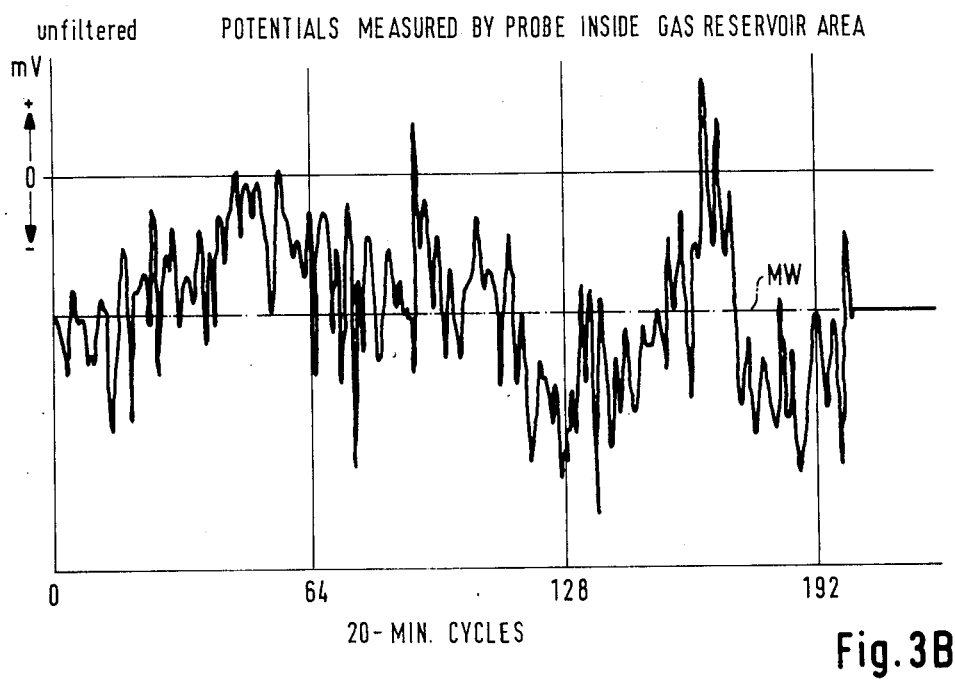
FIG. 3B is a graph similar to the graph shown by FIG. 3A for another probe located in the area of the surface over said reservoir.

When interpreting the values of potentials so logged over said time period for every in one such string of probes, the following conclusions may be derived:
(a) The average values of the potentials measured for said period by every probe located outside the area of the surface over the reservoir are clearly higher than the average values of the potentials measured by every probe located inside the area of the surface over the reservoir, as shown by FIGS. 3A and 3B and the reference potential shown in said two graphs.
(b) All curves representing the average values of said potentials show long-period variations mainly in response to the influences of long-period variations in the magnetotelluric field and in temperature over said time period.
(c) The differences between two succeeding potentials so measured by one probe are greater for probes located inside the area of the surface over the reservoir than for probes located outside the area of the surface over the reservoir, at least following the elimination of the effects of long-period variations as mentioned hereinabove.

Referring now to FIG. 2, a simple example of the method provided for by the present invention is explained for probes 1 through 24 of the string of measuring probes I.

The average values MW or the sum of all potentials measured by every probe in said string I in accordance with said method are determined over the above-referenced time period and each average potential so determined is plotted as a function of the distance of the probe for which said average is determined as shown by FIG. 2. The averages so determined in the illustrating example for probes 1 through 12 positively located outside the area of the surface over the gas reservoir are averaged and the overall average so determined is plotted as a straight line parallel to the x-axis, said straight line being prolonged in the direction of the remaining probes beyond probe no. 12 as shown by the broken line in FIG. 2. For the highest-number probes positively located inside the area of the surface over the gas reservoir in the illustrating example, a step function is computed for the potential averages which are clearly negative as shown by FIG. 2 but increase as the probes are located at points which are less distant from the gas/water interface of the underground gas reservoir, said step function being smoothed by a straight line passing through the corners of the curve representing said step function, the slope of said straight line corresponding to the slope of the curve representing said step function. Assuming an approximate linear decrease in the thickness of the gas layer in the underground reservoir as the edge of said reservoir is approached, the intersection of said curve smoothing said step function and said average line MW in FIG. 2 designated by GR may be taken to be the geometric location on the surface underneath which the gas/water interface is located.

A modified method of determining the gas/water interface in an underground aquifer storage reservoir proposed by the present invention is independent of the assumed linear decrease in the thickness of the gas layer referred to hereinabove and hereinafter described by reference to FIGS. 4 and 5.

Figure 4A:
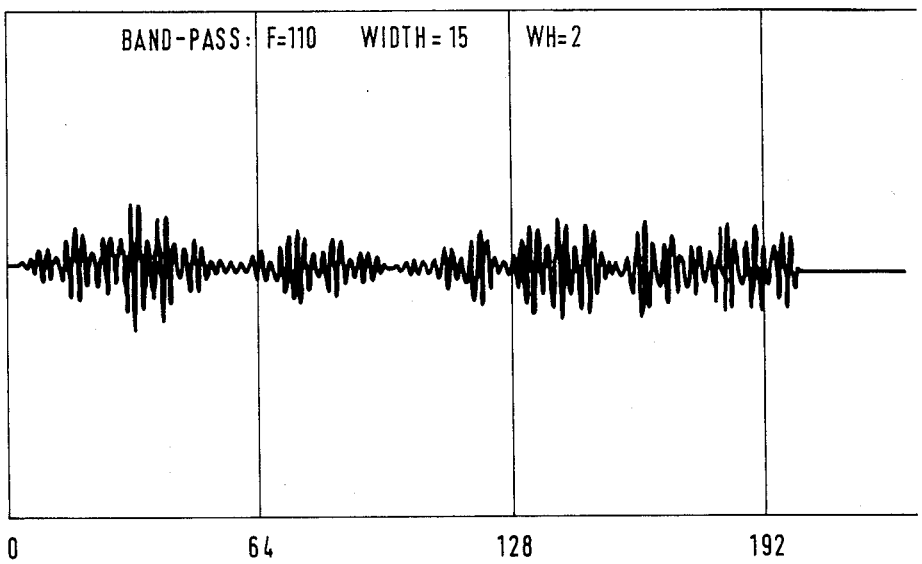
FIG. 4A is the potential curve shown by FIG. 3A as modified by high-pass filtering.
Figure 4B:
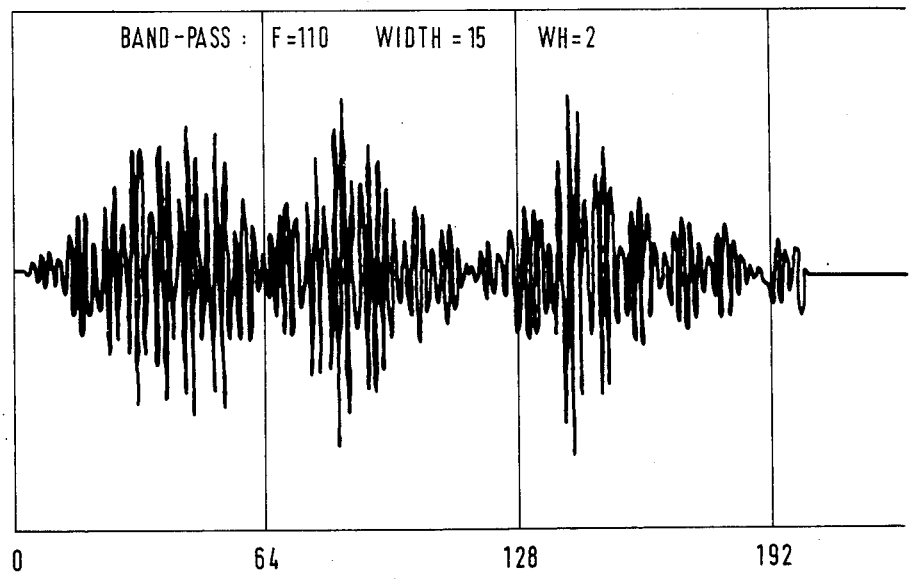
FIG. 4B is the potential curve shown by FIG. 3B as modified by high-pass filtering.

FIGS. 4A and 4B show the potential curves plotted in FIGS. 3A and 3B respectively following high-pass or band-pass filtering using in the illustrated example a 110/15 filter with a filter center at 0.78 hr. As FIGS. 4A and 4B show, the slow variations in the measured potentials substantially attributable to external influences changing as a function of time have been eliminated. The differences between the amplitude curves so obtained for the probe located outside the area of the surface over the underground reservoir (FIG. 4A) and the probe located inside the area of the surface over said reservoir (FIG. 4B) are significant.

Figure 5:
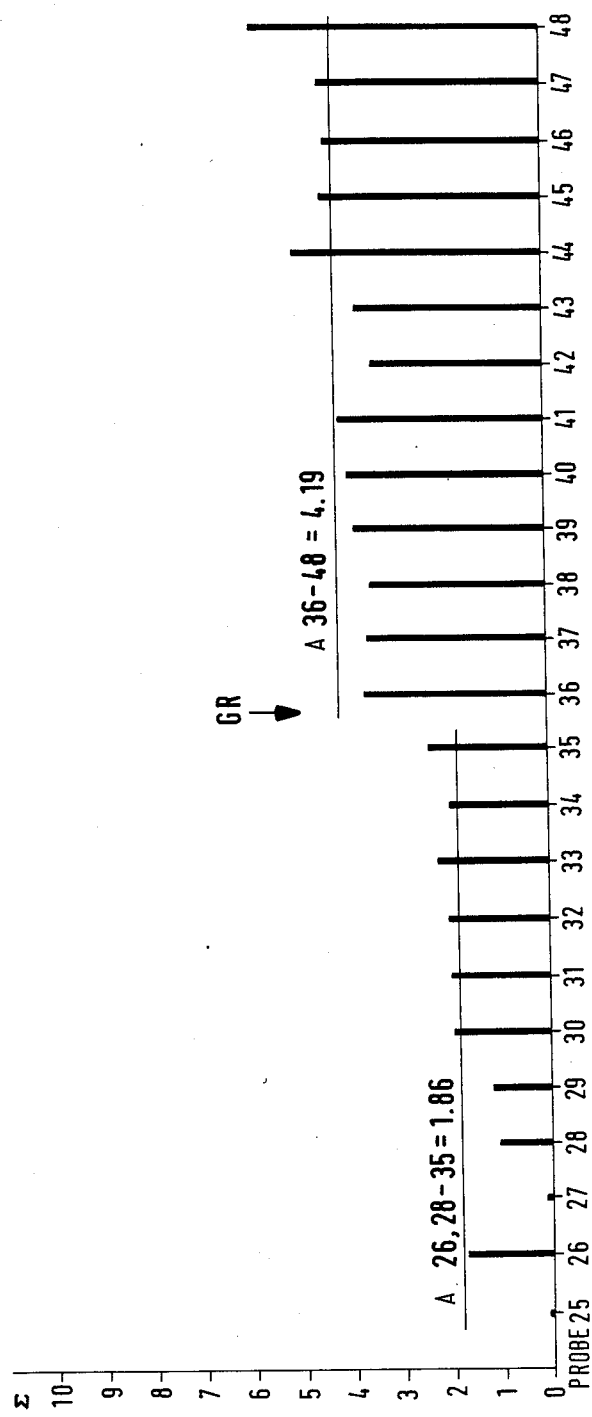
FIG. 5 is a representation of the differences between the values of potentials measured and the average values of potentials (following high-pass filtering) to determine the gas boundary for said string II in accordance with another aspect of the present invention.

Referring now to FIG. 5, in order to determine the gas/water interface GR the average of the amplitude variation of each probe of one of the strings of probes, string II from FIG. 1 being used as an example in FIG. 5, is plotted as a function of the above-ground distance at which said probe is located, said average changing abruptly at the point designated by GR between probe 35 and probe 36 in FIG. 5, said averages being otherwise relatively similar for the group of probes located outside the area of the surface over the underground reservoir and for the group of probes located inside the area of the surface over said reservoir. Said abrupt change in amplitude between relatively low amplitudes and relatively high amplitudes is taken to be the gas/water interface for the string of measuring probes II.

Using the method divulged herein, the gas/water interfaces GR for the strings of probes I, II, and III were determined by relatively simple surface potential measurement techniques, the results obtained by the relatively simple method described by reference to FIG. 2 and the improved method described by reference to FIG. 5 having been found to be in relatively good agreement with the reservoir data known from wells.

The experimental work described hereinabove has demonstrated for the first time in the history of geophysics that the presence of gas below the surface of the earth may be detected directly on the surface of the earth by a decrease in the ground potential or an abrupt change in amplitudes. The surface potential measurement technique divulged herein is therefore a second above-ground method of locating the presence of gas or other hydrocarbons in underground reservoirs, said novel method being substantially less costly than conventional seismic techniques. If a reference survey is made prior to the introduction of gas or other hydrocarbons into said underground reservoir, the increase in the thickness of the gas layer and the expansion of the gas may be measured directly by the potential measurement technique proposed by the present invention, as an underground storage reservoir is developed.

We claim:

1. A method of determining the locations of the hydrocarbon/water interfaces in an underground reservoir containing hydrocarbon compounds and more particularly gas or oil, the approximate locations of said interfaces being known, said method comprising the steps of:

laying at least one string of measuring probes comprising a plurality of measuring probes suitable for the measurement of surface potentials, said probes being linearly spaced relative to each other and being arranged such that at least two probes of said plurality of measuring probes are located outside and at least two other probes of said plurality of measuring probes are located inside the area of the surface over said reservoir;

measuring and polling the potentials measured by each such probe; sorting said probes, by using low and high potentials so polled, into probes (a) located positively over said reservoir, (b) positively not located over said reservoir and (c) located in an intermediate area;

computing an average value of potential from the potentials measured by each probe so located outside said area of the surface over said reservoir;

determining a step function from the average value of potential for every probe so located inside said area of the surface over said reservoir, with subintervals of said step function being related to the distances between said probes;

smoothing said step function and forming a smoothed function having a slope corresponding to the slope of said step function;

forming a linear function representing the average of all average values of potential computed for all probes so located positively outside said area of the surface over said reservoir;

prolonging the curve representing said linear function in the direction of said reservoir and determining the point of intersection between the curve so prolonged and the curve representing said smoothed function; and taking said point of intersection to be the location of a hydrocarbon/water interface in said reservoir.

2. A method according to claim 1 wherein said smoothed function is linear.

3. A method according to claim 2 wherein the probes of at least one such string are laid in an at least groupwise equally spaced relationship, wherein a two-dimensional rectangular coordinate system is provided in which one coordinate represents the position of the measuring probes in said string while said average values of potential for all probes in said string are plotted on the other coordinate each at its corresponding position along said first coordinate, and wherein said smoothed function is represented by a straight line passing substantially through said average values of potential for all probes in said string located inside said area of the surface over said reservoir.

4. A method according to claim 3 wherein the probes of said string of measuring probes are polled at a rate allowing the completion of one polling cycle for polling all probes of said string once within a time span not exceeding one minute.

5. A method according to claim 1 wherein the potentials so polled are batched for a preselectable number of polls to improve the signal-to-noise ratio.

6. A method according to claim 5 wherein the potentials so batched are transferred to a magnetic data medium associated with a microcomputer for digital storage.

7. A method according to claim 1 wherein a reference survey of the underground reservoir area is first made and surface potential surveys are made thereafter to determine the increase in at least one parameter of a group of parameters consisting of the thickness and the extension of the hydrocarbon compound accumulation in said reservoir.

8. An improved method of determining the locations of hydrocarbon/water interfaces in an underground reservoir for determining the expansion of hydrocarbon compounds in said reservoir, the approximate extension of said hydrocarbon compounds being known, said improved method comprising the steps of:

laying at least one string of measuring probes comprising a plurality of measuring probes suitable for the measurement of surface potentials, said probes being linearly spaced relative to each other and being arranged such that at least two probes of said plurality of measuring probes are located outside and at least two other probes of said plurality of measuring probes are located inside the area of the surface over said reservoir;

polling the potentials measured by every probe in a sequence of periodic cycles to determine the periodic potentials at every probe;

high-pass filtering the periodic potential signals so polled for every probe in a sequence of cycles to separate higher-frequency variations in said signals (differences in amplitudes) from substantially lower-frequency variations in said signals;

determining from said higher-frequency variations for each probe at least one value of the group consisting of the average value of all such signals and the sum of all such signals as a measure of the higher-frequency amplitude for each such probe; comparing the higher-frequency amplitudes of all probes of said at least one string of measuring probes;

determining the location at which the higher-frequency amplitudes of adjacent probes change abruptly; and taking said location to be the location of the hydrocarbon/water interface in said reservoir.

9. A method according to claim 8 wherein the frequency of said periodic cycles is substantially higher than the frequency of changes in environmental parameters to substantially reduce the effect of such environmental parameters.

10. A method according to claim 9 wherein said changes in environmental parameters are the electric field effects in the earth.

11. A method according to claim 9 wherein said changes in environmental parameters are changes in temperature.

12. A method according to claim 8 wherein the frequency of said periodic cycles is substantially higher than the frequency of changes in environmental parameters such as electric field effects in the earth and temperature, to substantially reduce the effect of such environmental parameters.

13. A method according to claim 8 wherein the probes of one such string of measuring probes are polled at a rate allowing the completion of one polling cycle for polling all probes of said string once within a time span not exceeding one minute.

14. A method according to claim 8 wherein the signals so polled are batched for a preselectable number of polls to improve the signal-to-noise ratio.

15. A method according to claim 14 wherein the signals so batched are transferred to a magnetic data medium associated with a micro-computer for digital storage.

* * * * *